United States Patent
Shriver et al.

(10) Patent No.: US 11,021,115 B2
(45) Date of Patent: Jun. 1, 2021

(54) ROOF DITCH SEALING ASSEMBLIES FOR VEHICLES INCLUDING PRE-GELLED ROOF DITCH SEALER STRIPS AND METHODS OF SEALING ROOF DITCHES

(71) Applicant: Toyota Motor Engineering & Manufacturing North America, Inc., Plano, TX (US)

(72) Inventors: Daniel G. Shriver, Ann Arbor, MI (US); Prasanth Mohankumar, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 153 days.

(21) Appl. No.: 16/388,337

(22) Filed: Apr. 18, 2019

(65) Prior Publication Data

US 2020/0331411 A1 Oct. 22, 2020

(51) Int. Cl.
| | |
|---|---|
| *B60R 13/06* | (2006.01) |
| *B62D 25/06* | (2006.01) |
| *B29C 39/02* | (2006.01) |
| *B29C 65/48* | (2006.01) |
| *B29K 27/06* | (2006.01) |
| *B29K 105/00* | (2006.01) |
| *B29L 31/30* | (2006.01) |

(52) U.S. Cl.
CPC ............. *B60R 13/06* (2013.01); *B29C 39/02* (2013.01); *B29C 65/48* (2013.01); *B62D 25/06* (2013.01); *B29K 2027/06* (2013.01); *B29K 2105/0061* (2013.01); *B29L 2031/30* (2013.01)

(58) Field of Classification Search
CPC .......... B60R 13/06; B60J 10/25; B62D 25/06; B62D 25/07; B29C 39/02; B29C 65/4815; B29K 2027/06; B29K 2105/0061; B29L 2031/30
USPC .......................................... 296/93, 210, 213
See application file for complete search history.

(56) References Cited

U.S. PATENT DOCUMENTS

| | | | | |
|---|---|---|---|---|
| 4,618,181 | A * | 10/1986 | Tokuda ................... | B62D 25/07 296/191 |
| 4,792,180 | A * | 12/1988 | Jacobsen .................. | B60J 10/00 296/210 |
| 4,900,771 | A * | 2/1990 | Gerace ................. | C09D 127/06 524/296 |
| 5,964,979 | A * | 10/1999 | George ................... | B60R 13/04 156/295 |
| 6,030,701 | A | 2/2000 | Johnson et al. | |
| 6,287,669 | B1 | 9/2001 | George et al. | |
| 6,858,260 | B2 | 2/2005 | Pachl et al. | |
| 6,945,592 | B1 * | 9/2005 | Hui ......................... | B60R 13/04 296/187.01 |
| 8,236,128 | B2 * | 8/2012 | Kassa ..................... | C09J 163/00 156/325 |

(Continued)

*Primary Examiner* — Gregory A Blankenship
(74) *Attorney, Agent, or Firm* — Dinsmore & Shohl LLP

(57) ABSTRACT

A method of filling a roof ditch of a vehicle roof assembly is provided. The method includes delivering a sealer material to a mold channel of a mold. The sealer material is heated within the mold channel at a pre-gel heating temperature forming a pre-gelled roof ditch sealer strip. The pre-gelled roof ditch sealer strip is removed from the mold. The pre-gelled roof ditch sealer strip is installed into the roof ditch of the vehicle roof assembly.

14 Claims, 4 Drawing Sheets

(56) References Cited

U.S. PATENT DOCUMENTS

| | | | | |
|---|---|---|---|---|
| 8,783,751 | B2* | 7/2014 | Bland | B60J 10/30 |
| | | | | 296/1.08 |
| 8,962,134 | B2 | 2/2015 | Pachl et al. | |
| 10,800,351 | B2* | 10/2020 | Shriver | B60R 13/04 |
| 2002/0011308 | A1* | 1/2002 | Johnson | B32B 27/08 |
| | | | | 156/303.1 |
| 2005/0224173 | A1 | 10/2005 | Kitano et al. | |
| 2008/0226866 | A1* | 9/2008 | Vilcek | B60R 13/06 |
| | | | | 428/99 |
| 2008/0277973 | A1* | 11/2008 | Mourou | B60R 13/04 |
| | | | | 296/210 |
| 2009/0051183 | A1* | 2/2009 | Mourou | B60R 13/07 |
| | | | | 296/1.08 |
| 2009/0152903 | A1* | 6/2009 | Fuchs | B60R 9/058 |
| | | | | 296/210 |
| 2011/0118387 | A1 | 5/2011 | Sophiea et al. | |
| 2015/0367788 | A1* | 12/2015 | Hudina | B62D 25/02 |
| | | | | 296/191 |
| 2016/0023293 | A1* | 1/2016 | Kurokawa | B23K 1/0008 |
| | | | | 296/29 |

* cited by examiner

ROOF DITCH SEALING ASSEMBLIES FOR VEHICLES INCLUDING PRE-GELLED ROOF DITCH SEALER STRIPS AND METHODS OF SEALING ROOF DITCHES

TECHNICAL FIELD

The present specification generally relates to vehicle roofs and, more specifically, to roof ditch sealing assemblies for vehicle roofs including pre-gelled sealer strips and methods of sealing roof ditches.

BACKGROUND

Many vehicles include vehicle roofs that are welded to side panels of the vehicles. In order to facilitate welding, the vehicle roofs may be provided with a roof ditch that runs lengthwise along the vehicle roofs, between the vehicle roofs and the side panels of the vehicles. After welding the roofs to the side panels, the roof ditches may be filled with a sealer and/or preformed molding. The sealer may be in a liquid form and may tend to run lengthwise along the roof ditches. Such running of the sealer may be particularly pronounced for curved roofs and create inconsistent end portions. For example, as sealers are poured into the roof ditches and then allowed to cure, the ambient environment can affect the cure of the sealer leading to an inconsistent length and formation of gaps between the sealer and adjacent moldings. Moldings, while being solid and having relatively unchanging lengths, tend to be relatively expensive, require preforming and then assembly to the roof ditches. Further, moldings may require fasteners that anchor to the vehicle roofs, which can provide an access point for water to enter an interior of the vehicle.

What is needed are roof ditch sealing assemblies that are formed using pre-gelled roof ditch sealer strips that are partially cured at a location away from the vehicle to a predetermined size and then assembled within the roof ditches and finally cured.

SUMMARY

In accordance with one embodiment, a method of filling a roof ditch of a vehicle roof assembly is provided. The method includes delivering a sealer material to a mold channel of a mold. The sealer material is heated within the mold channel at a pre-gel heating temperature forming a pre-gelled roof ditch sealer strip. The pre-gelled roof ditch sealer strip is removed from the mold. The pre-gelled roof ditch sealer strip is installed into the roof ditch of the vehicle roof assembly.

In another embodiment, a vehicle includes a roof assembly including a roof having an outer facing surface and a roof ditch that extends below the outer facing surface. The roof ditch extends in a vehicle longitudinal direction between a front windshield and a rear window. A pre-gelled roof ditch sealer strip extends along a front portion of the roof ditch and rearward in the vehicle longitudinal direction toward a rear portion of the roof ditch.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Pickup trucks according to the present specification include a passenger cabin and a truck bed located rearward of the passenger cabin. The cabins are formed by side panels and a roof assembly that is connected to the side panels at opposite sides of the roof assembly. The roof assembly includes a vehicle roof that is connected to one side panel along a roof ditch that extends lengthwise from a front of the vehicle roof to a rear to the vehicle roof. The vehicle roof is also connected to another side panel along another roof ditch that extends lengthwise from the front of the vehicle roof to the rear of the vehicle roof.

A cured roof ditch sealer strip extends along the roof ditch from the front of the vehicle roof toward the rear of the vehicle roof. The cured roof ditch sealer strip is formed from a pre-gelled roof ditch sealer strip that has been partially cured before application to the vehicle. The pre-gelled roof ditch sealer strip is initially formed remote from the vehicle into an elongate strip from a workable resin material that is then only partially cured for the material's gel time until the sealer material gels. The term "gel time" refers to the time it takes for a resin material to gel or become so highly viscous that it can no longer be considered workable. Gelation of the sealer material is where the chemical reaction during the curing process has proceeded sufficiently so that the sealer material has achieved a flexible and non-flowing 3-D structure. For example, the sealer material may be heated at between about 120° C. and about 160° C. for between about three minutes and about eight minutes, such as at about 140° C. for about five minutes until the sealer material reaches a surface temperature of between about 90° C. and about 110° C. While pre-gelling of the sealer material may be accomplished using heat, room temperature gelling may be used depending on the sealer material using, for example, moisture, light or a multi-component (e.g., resin and catalyst) system. The pre-gelled roof ditch sealer strip may then be delivered to the vehicle for installation within the roof ditch and then fully cured in situ, as will be described in greater detail below.

Figure 1:
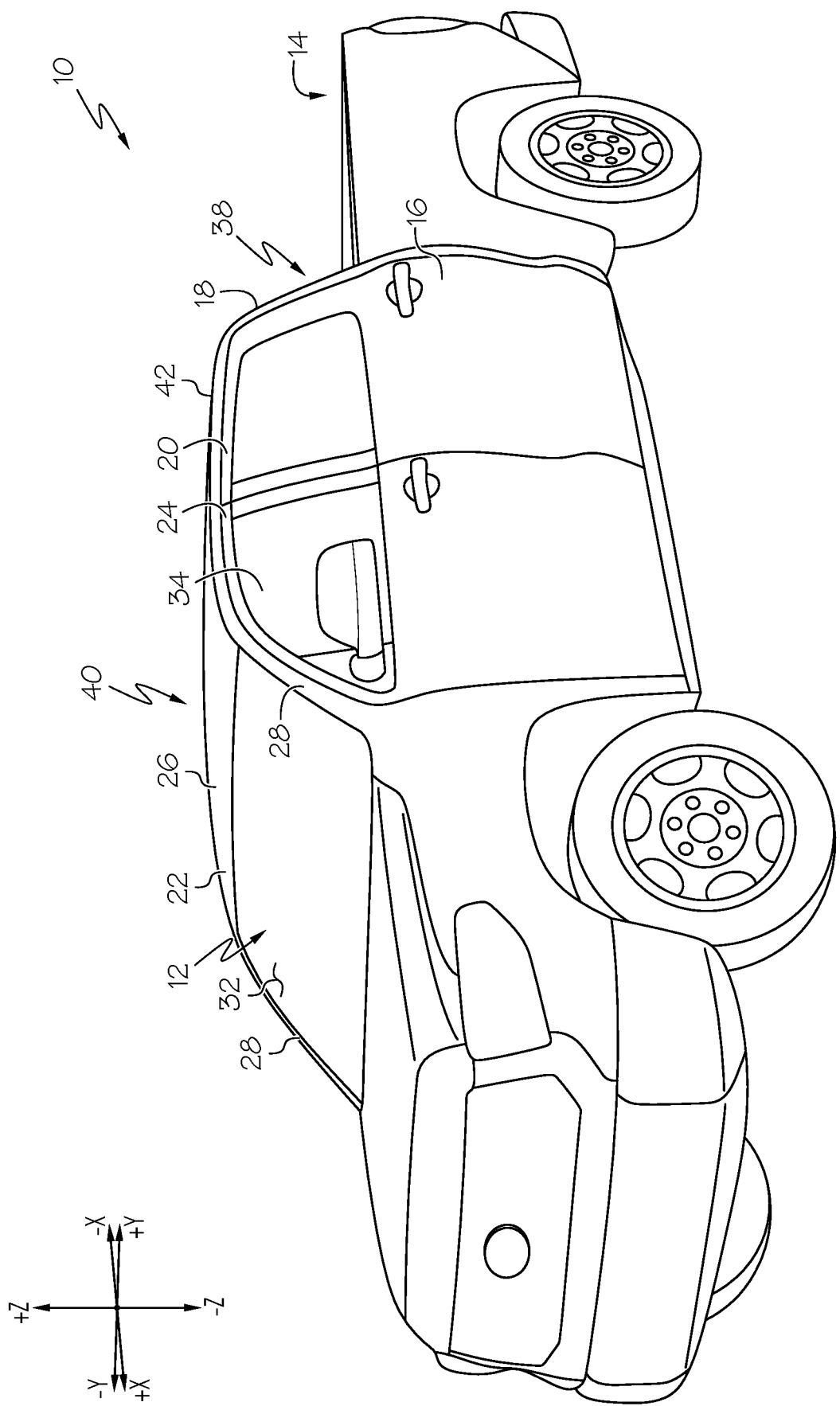
FIG. 1 depicts a front perspective view of a pickup truck, according to one or more embodiments shown and described herein.

As used herein, the term "vehicle longitudinal direction" refers to the forward-rearward direction of the pickup truck (i.e., in the +/− vehicle Y direction depicted in FIG. 1). The term "vehicle lateral direction" refers to the cross-pickup truck direction (i.e., in the +/− vehicle X direction depicted in FIG. 1), and is transverse to the vehicle longitudinal direction. The term "vehicle vertical direction" refers to the upward-downward direction of the pickup truck (i.e., in the +/− vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

The terms "outboard" or "outward" as used herein refers to the relative location of a component in a direction with respect to a pickup truck centerline. The term "inboard" or "inward" as used herein refers to the relative location of a component in a direction with respect to the pickup truck centerline. Because the pickup truck structures may be generally symmetrical about the pickup truck centerline, the direction to which use of terms "inboard," "inward," "outboard" and "outward" refer may be mirrored about the pickup truck centerline when evaluating components positioned along opposite sides of the pickup truck 10.

Referring to FIG. 1, a pickup truck is generally illustrated at 10. The pickup truck 10 includes a passenger cabin 12 and a truck bed 14. The pickup truck 10 includes a vehicle body including a body framework 18 that includes a pair of side panels 20 and 22 with side roof rail structures 24 and 26 and front pillars 28. The front pillars 28 are connected to the side roof rail structures 24 and 26 and extend downwardly therefrom in the vehicle vertical direction. The front pillars 28 are located toward a forward end of the vehicle 10, generally between a front windshield 32 and front side windows 34.

The vehicle 10 includes a vehicle roof assembly 40 including a vehicle roof 42 that extends in the vehicle lateral direction between the side roof rail structures 24 and 26 and in the vehicle longitudinal direction between the front windshield 32 and a rear window 38. While only an outer vehicle panel is illustrated, the vehicle roof 42 may be formed of multiple panels, such as an inner vehicle panel that is connected to the outer vehicle panel. Further, the vehicle roof assembly 40 may include a headliner that can form an interior panel of the vehicle roof assembly 40 that can be viewed from within the cabin 12 of the vehicle 10. The headliner can also cover at least portions of the remaining vehicle roof assembly 40 from view from within the cabin 12.

Figure 2:
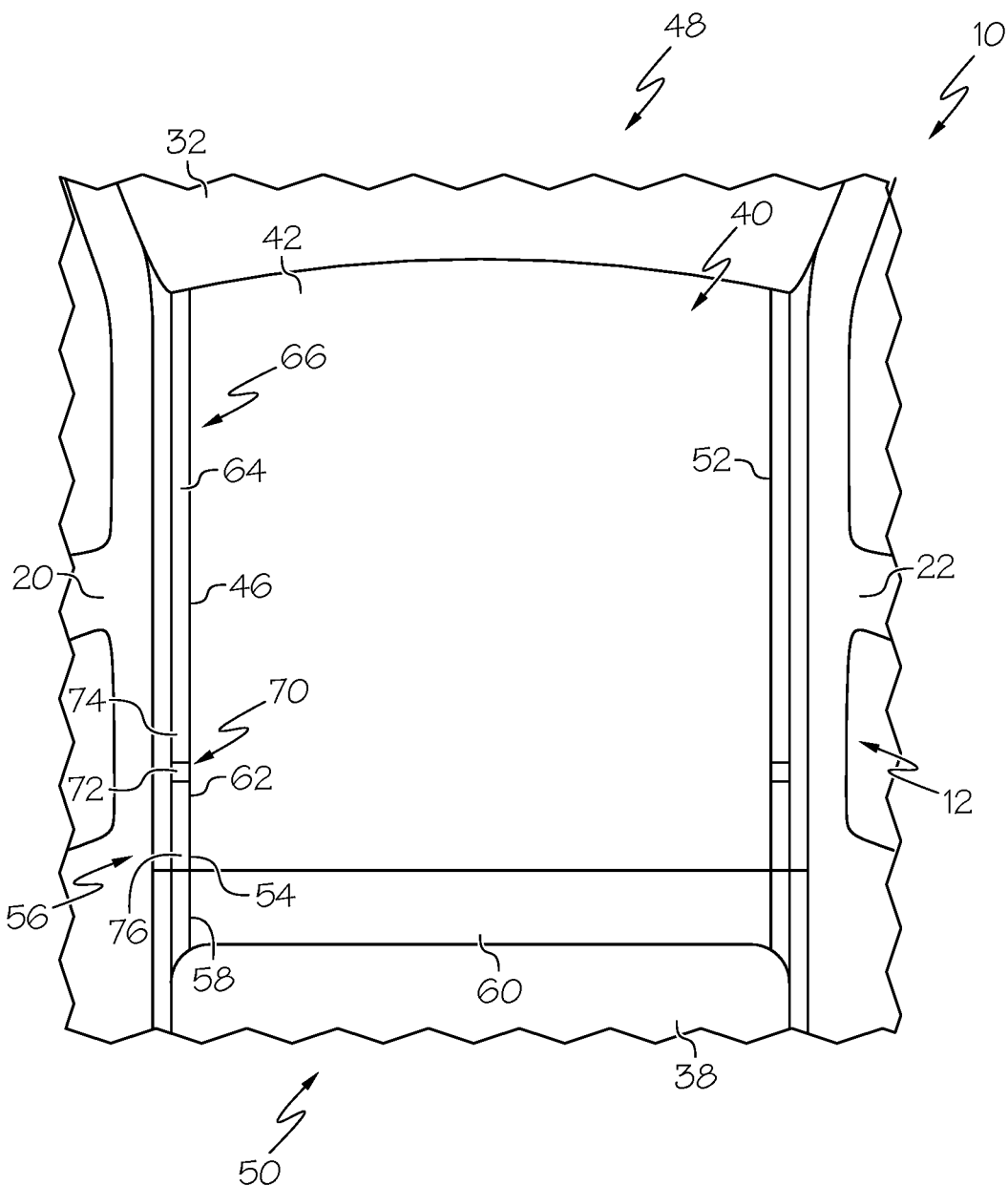
FIG. 2 schematically depicts a top of the pickup truck of FIG. 1 illustrating a roof assembly, according to one or more embodiments shown and described herein.

Referring to FIG. 2, a diagrammatic top view of the pickup truck 10 is illustrated including the side panels 20 and 22 and the vehicle roof assembly 40. The vehicle roof assembly 40 includes the vehicle roof 42 that is connected to one side panel 20 along a roof ditch 46 that extends lengthwise between the front windshield 32 of the vehicle roof 42 and the rear window 38 of the vehicle roof 42. The vehicle roof 42 is also connected to another side panel 22 along another roof ditch 52 that extends lengthwise from the front 48 of the vehicle roof 42 to the rear 50 of the vehicle roof 42.

A rear roof ditch molding 54 is located at least partially within the roof ditch 46 at a rear portion 56 of the roof ditch 46. The rear roof ditch molding 54 is preformed and then installed into the roof ditch 46. The rear roof ditch molding 54 has a rear portion 58 that extends along a rear wall 60 of the passenger cabin 12 and a roof portion 62 that extends along the vehicle roof 42. A cured roof ditch sealer strip 64 extends along a front portion 66 of the roof ditch 46. The cured roof ditch sealer strip 64 may be, for example, a PVC based body sealer with select additives for UV/Mold protection. A combination roof ditch sealer dam and molding clip 70 is located at least partially between the rear roof ditch molding 54 and the cured roof ditch sealer strip 64. In particular, the combination roof ditch sealer dam and molding clip 70 includes a roof ditch sealer dam 72 located between a rear end 74 of the roof ditch sealer strip 64 and a front end 76 of the rear roof ditch molding 54. The roof ditch sealer dam 72 can inhibit overlap between the roof ditch sealer strip 64 and rear roof ditch molding 54 and provides a stop surface against which the roof ditch sealer strip 64 can abut to reduce any gap formation between the rear roof ditch molding 54 and the roof ditch sealer strip 64 in a reliable fashion.

Figure 3:
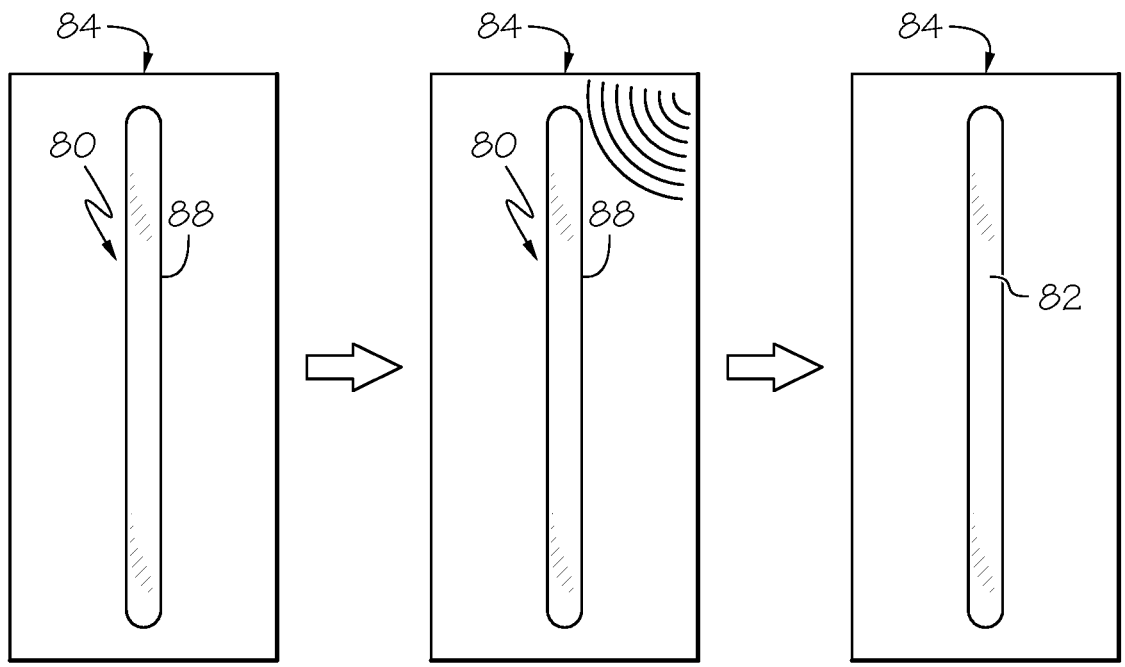
FIG. 3 illustrates a method of forming a pre-gelled roof ditch sealer strip, according to one or more embodiments shown and described herein.
Figure 3:
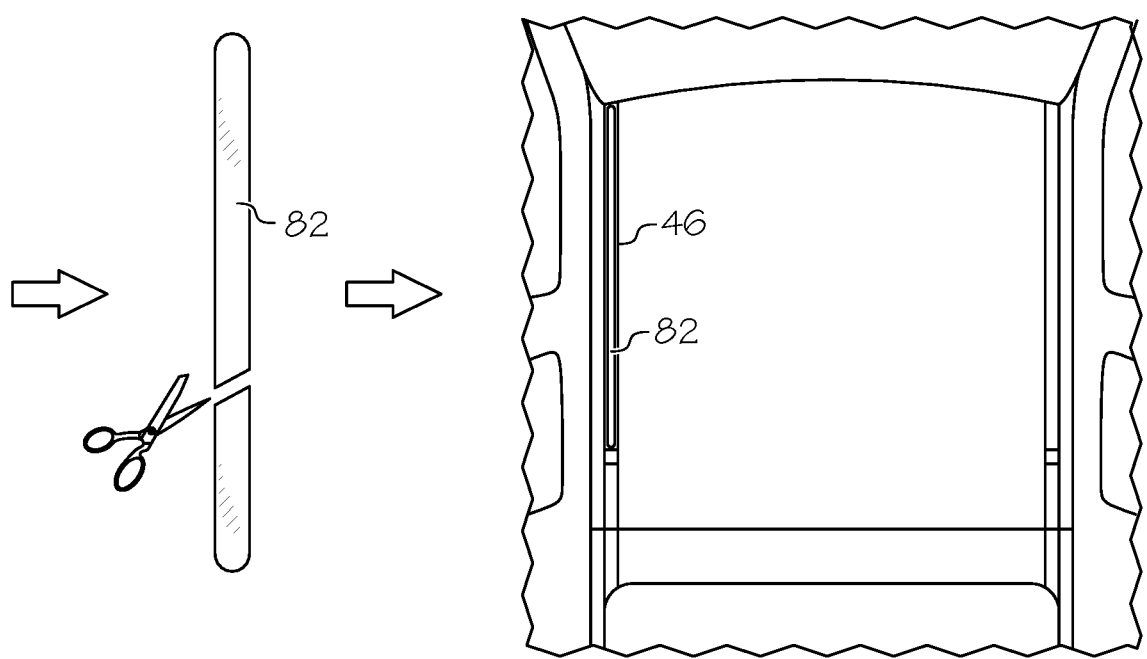
Figure 4:
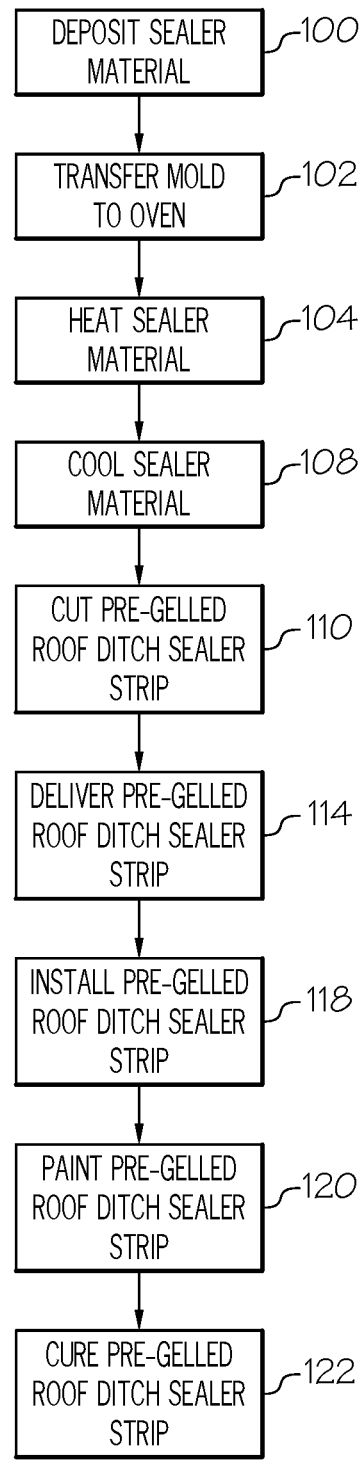
FIG. 4 illustrates a method of filling a roof ditch of a vehicle roof assembly using the pre-gelled roof ditch sealer strip of FIG. 3, according to one or more embodiments shown and described herein.

Referring to FIGS. 3 and 4, a sealer material 80 is poured or otherwise deposited within a mold channel 88 of mold 84 (e.g., formed of silicon) at step 100 of FIG. 4. The mold 84 may then be transferred to an oven at step 102 where the sealer material 80 is heated at a temperature of between about 120° C. and about 160° C., such as about 140° C. at step 104. While heating is described herein, there may be other methods of gelling depending on the type of sealer material. The sealer material 80 may be heated at that temperature for between about three and about eight minutes, such as about five minutes until a surface temperature of the sealer material 80 reaches between about 90° C. and about 110° C. The sealer material 80 may then be allowed to cool (e.g., at room temperature) forming a pre-gelled roof ditch sealer strip 82 at step 108. The pre-gelled roof ditch sealer strip 82 may then be cut to a desired length at step 110, which may depend on the model of vehicle to which the roof ditch sealer strip 82 is being installed.

The pre-gelled roof ditch sealer strip 82 may then be delivered to the vehicle and placed within the roof ditch 46 (FIG. 2) at step 114. Because of the gelation of the pre-gelled roof ditch sealer strip 82, the pre-gelled roof ditch sealer strip 82 maintains its shape as it is delivered and installed within the roof ditch 46. In some embodiments, an adhesive coating may be applied to the pre-gelled roof ditch sealer strip 82 and/or to the roof ditch 46 prior to installation of the pre-gelled roof ditch sealer strip 82 into the roof ditch 46 at step 114. The rear roof ditch molding 54 may then be installed adjacent the pre-gelled roof ditch sealer strip 82 at step 118. At step 120, the pre-gelled roof ditch sealer strip 82 may then be painted along with the rest of the vehicle 10 and then baked with the vehicle 10 at a cure temperature that is higher than the pre-gel heating temperature (e.g., greater than 120° C.) to fully cure the sealer material and form the cured roof ditch sealer strip 64 at step 122. In some embodiments, the mold channel 88 may be formed smaller than a width dimension of the corresponding roof ditch 46, as the pre-gelled roof ditch sealer strip 82 may expand between about 10 percent and about 20 percent while undergoing the final curing at the second, higher temperature.

The above-described roof ditch sealing assemblies are formed using pre-gelled roof ditch sealer strips that are partially cured (pre-gelled) at a location away from the vehicle at a first gelling temperature, then assembled within the roof ditches and finally cured at a higher curing temperature. The final curing may take place when the vehicle paint is finally baked at the elevated curing temperature, rather than as a separate step. The pre-gelled roof ditch sealers can hold their shape, which can make them useful for installing in vehicles with relatively steeply curved roofs, such as sedans and coupes. The pre-gelled roof ditch sealers combine the benefits of both a plastic molded strip, which are relatively easily installed compared to fluid sealers and PVC sealers that are paintable and prevent disengagement during windy or car wash conditions.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of filling a roof ditch of a vehicle roof assembly, the method comprising:
    delivering a sealer material to a mold channel of a mold;
    heating the sealer material within the mold channel at a pre-gel heating temperature forming a pre-gelled roof ditch sealer strip;
    removing the pre-gelled roof ditch sealer strip from the mold; and
    installing the pre-gelled roof ditch sealer strip into the roof ditch of the vehicle roof assembly.

2. The method of claim 1 further comprising heating the pre-gelled roof ditch sealer strip in the roof ditch at a cure temperature that is greater than the pre-gel heating temperature.

3. The method of claim 2, wherein the pre-gel temperature is between about 120° C. and about 160° C.

4. The method of claim 2, wherein the sealer material is heated at the pre-gel heating temperature to a surface temperature of between about 90° C. and about 110° C.

5. The method of claim 2, wherein the pre-gelled roof ditch sealer strip expands between about 10 percent and about 20 percent in width during the step of heating the pre-gelled roof ditch sealer strip at the cure temperature.

6. The method of claim 2 further comprising painting the pre-gelled sealer strip before the step of heating the pre-gelled roof ditch sealer strip at the cure temperature.

7. The method of claim 1 further comprising trimming the pre-gelled roof sealer strip before the step of installing the pre-gelled roof sealer strip into the roof ditch.

8. The method of claim 1 further comprising applying an adhesive to one or both of the roof ditch and the pre-gelled roof sealer strip.

9. The method of claim 1, wherein the sealer material comprises polyvinylchloride.

10. A vehicle comprising:
    a roof assembly comprising a roof having an outer facing surface and a roof ditch that extends below the outer facing surface, the roof ditch extends in a vehicle longitudinal direction between a front windshield and a rear window;
    a pre-gelled roof ditch sealer strip that extends along a front portion of the roof ditch and rearward in the vehicle longitudinal direction toward a rear portion of the roof ditch; and
    a roof ditch sealer dam located between a rear end of the pre-gelled roof ditch sealer strip and a front end of the rear roof ditch molding.

11. The vehicle of claim 10 further comprising a rear roof ditch molding located at the rear portion of the roof ditch.

12. The vehicle of claim 10, wherein the pre-gelled roof ditch sealer strip comprises polyvinylchloride.

13. The vehicle of claim 10, wherein the pre-gelled roof ditch sealer strip is configured to be cured at a cure temperature while positioned in the roof ditch.

14. The vehicle of claim 10 further comprising an adhesive between the pre-gelled roof ditch sealer strip and the roof ditch.

* * * * *